(12) United States Patent
Kumar et al.

(10) Patent No.: US 11,999,382 B2
(45) Date of Patent: *Jun. 4, 2024

(54) METHODS AND APPARATUS FOR CAUSING A LANE CHANGE MANEUVER OF AN AUTONOMOUS VEHICLE

(71) Applicant: PlusAI, Inc., Santa Clara, CA (US)

(72) Inventors: Amit Kumar, Sunnyvale, CA (US); Lichun Yang, Cupertino, CA (US); Anurag Ganguli, Saratoga, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,837

(22) Filed: Jan. 13, 2023

(65) Prior Publication Data

US 2023/0311944 A1 Oct. 5, 2023

Related U.S. Application Data

(63) Continuation of application No. 17/710,859, filed on Mar. 31, 2022, now Pat. No. 11,565,719.

(51) Int. Cl.
*B60W 60/00* (2020.01)
*B60W 40/09* (2012.01)
*B60W 50/14* (2020.01)

(52) U.S. Cl.
CPC ........ *B60W 60/0015* (2020.02); *B60W 40/09* (2013.01); *B60W 50/14* (2013.01); *B60W 60/0059* (2020.02); *B60W 2050/146* (2013.01); *B60W 2420/403* (2013.01); *B60W 2510/0638* (2013.01)

(58) Field of Classification Search
None
See application file for complete search history.

(56) References Cited

U.S. PATENT DOCUMENTS

| | | |
|---|---|---|
| 11,299,162 B2 | 4/2022 | Kinoshita et al. |
| 2016/0091896 A1 | 3/2016 | Maruyama |
| 2016/0358477 A1* | 12/2016 | Ansari ................ G06Q 40/08 |
| 2017/0248957 A1* | 8/2017 | Delp .................... B60W 10/20 |
| 2020/0086887 A1 | 3/2020 | Gohl et al. |
| 2020/0406932 A1 | 12/2020 | Yamanouchi et al. |
| 2021/0237739 A1 | 8/2021 | Hayakawa et al. |
| 2021/0276560 A1 | 9/2021 | Hirosawa et al. |

* cited by examiner

*Primary Examiner* — Tamara L Weber
(74) *Attorney, Agent, or Firm* — Sheppard Mullin Richter & Hampton LLP

(57) ABSTRACT

In one or more embodiments, a method comprises receiving, at a processor, an input signal from an input device in response to a first actuation of the input device by a driver of an autonomous vehicle. The input device is a device disposed with the autonomous vehicle and has a second actuation of the input device associated with a standard operation of the input device. The second actuation has an actuation pattern different from an actuation pattern of the first actuation. In response to the input signal, a determination is made by the processor to determine whether the autonomous vehicle can perform a maneuver safely. In response to determining that the autonomous vehicle can perform the maneuver safely, a signal is sent by the processor to cause the autonomous vehicle to perform the maneuver.

19 Claims, 4 Drawing Sheets

METHODS AND APPARATUS FOR CAUSING A LANE CHANGE MANEUVER OF AN AUTONOMOUS VEHICLE

CROSS-REFERENCE TO RELATED APPLICATIONS

This application is a continuation of U.S. patent application Ser. No. 17/710,859, filed on Mar. 31, 2022 and entitled "METHODS AND APPARATUS FOR CAUSING A LANE CHANGE MANEUVER OF AN AUTONOMOUS VEHICLE", which is incorporated in its entirety herein by reference.

FIELD OF THE DISCLOSURE

In one or more embodiments, a maneuver by an autonomous vehicle can be performed after receiving an input signal from an input device actuated in an actuation pattern by a driver of the autonomous vehicle and after a determination is performed that the autonomous vehicle can perform a maneuver safely.

BACKGROUND

Automatic lane change in autonomous vehicle often requires driver's consent, for example, as defined by certain states' laws. In some scenarios, an action by driver not intended to indicate consent can be accidentally interpreted as indicating consent. Thus, it is desirable for drivers to act differently or distinctly to indicate consent of lane change in an autonomous vehicle to avoid unintended consent. Automatic lane change in large-sized autonomous vehicles face additional challenges. Due to their large size and weight, it is often desirable for large-sized vehicles to have more time/distance to safely perform appropriate maneuvers.

SUMMARY

In one or more embodiments, a method comprises receiving, at a processor, an input signal from an input device in response to a first actuation of the input device by a driver of an autonomous vehicle. The input device is a device disposed with the autonomous vehicle and has a second actuation of the input device associated with a standard operation of the input device. The second actuation has an actuation pattern different from an actuation pattern of the first actuation. In response to the input signal, a determination is made by the processor to determine whether the autonomous vehicle can perform a maneuver safely. In response to determining that the autonomous vehicle can perform the maneuver safely, a signal is sent by the processor to cause the autonomous vehicle to perform the maneuver.

In one or more embodiments, an apparatus comprises a processor, a communication interface operatively coupled to the processor and configured to send and receive signals over a communication backbone of an autonomous vehicle, and a memory operatively coupled to the processor. The memory stores instructions to cause the processor to receive an input signal from an input device of the autonomous vehicle in response to a first actuation of the input device by a driver of the autonomous vehicle. The input device has a second actuation associated with a standard operation of the input device, the second actuation having an actuation pattern different from an actuation pattern of the first actuation. In response to the input signal, a determination is made at the processor to determine whether the autonomous vehicle can perform a maneuver safely. A signal is sent, in response to determining that the autonomous vehicle can perform the maneuver safely, to cause the autonomous vehicle to perform the maneuver.

In one or more embodiments, a method comprises receiving, at a processor, an input signal from an input device in response to a first actuation of the input device by a driver of an autonomous vehicle. The input device is configured to be actuated by a second actuation by the driver. The second actuation has an actuation pattern that is an actuation of the input device once within a predefined time period. The first actuation has an actuation pattern that is an actuation of the input device twice within the predefined time period. In response to the input signal, a determination is made by the processor whether the autonomous vehicle can perform a maneuver safely. In response to determining that the autonomous vehicle can perform the maneuver safely, a signal is sent by the processor to cause the autonomous vehicle to automatically perform the maneuver.

DETAILED DESCRIPTION

Automatic lane change in an autonomous vehicle often requires driver's consent, for example, as defined by certain states' laws. Thus, it can be desirable to cause a lane change maneuver to be safely performed by autonomous vehicle with driver's consent to reduce the risks associated with lane changing. Currently, in some known drivers assist systems, driver's consent of lane change can involve actuation signals such as single-tapping on a touch screen, single-toggling a turn signal lever, single pressing a button, single turning of a knob, etc. Sometimes, these actuation signals that indicate driver's consent of a lane change maneuver can be performed by the driver unintentionally and be interpreted by the driver assist system as indicating lane change consent. Moreover, automatic lane change in large-sized autonomous vehicles such as self-driving heavy trucks can occasionally face additional challenges. For example, due to their large size and weight, it can be desirable for large-sized vehicles to have more time/distance to safely perform appropriate maneuvers.

With the increasing prevalence of self-driving vehicles, systems and methods to cause automatic lane change to be performed safely in self-driving vehicles with driver's consent are desirable. One or more embodiments discussed herein can solve the above-discussed problems by introducing different or distinct actuation patterns to indicate driver's lane change consent. These different or distinct actuation patterns differ from the above-mentioned actuation pattens by involving a predefined time period for the driver to perform two successive actions to indicate consent, thereby avoiding unintended consent. Moreover, one or more embodiments can determine if the lane change maneuver in autonomous vehicle such as self-driving heavy truck can be performed safely. If it is determined that the autonomous vehicle can perform the lane change maneuver safely after receiving the driver's lane change consent, the one or more embodiments can send a signal to cause the autonomous vehicle to perform the lane change maneuver.

Figure 1:
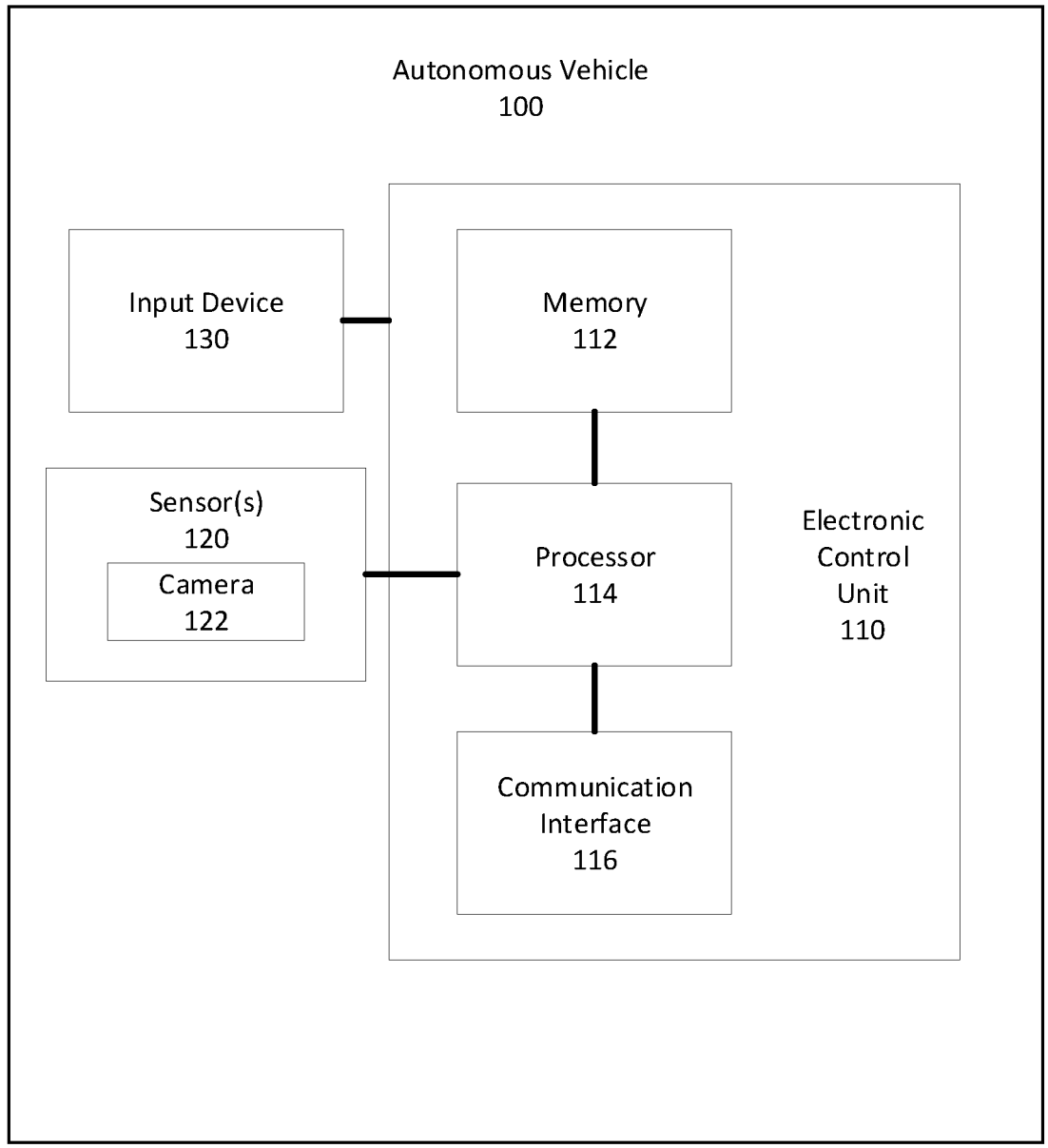
FIG. 1 shows a block diagram of an autonomous vehicle that can perform a lane change maneuver safely, according to an embodiment.

FIG. 1 shows a block diagram for an autonomous vehicle 100, according to one embodiment. The autonomous vehicle 100 can be any type of vehicle, such as a car, bus, or semitruck. The autonomous vehicle 100 includes an electronic control unit 110, sensor(s) 120 operatively coupled to the electronic control unit 110, and an input device 130 operatively coupled to the electronic control unit 110. The electronic control unit 110 includes a processor 114, memory 112 operatively coupled to the processor 114, and a communication interface 116 operatively coupled to the processor 114. The sensor(s) 120 is operatively coupled to the processor 114. The processor 114 can be configured to perform (or cause to be performed) any of the techniques discussed herein.

The processor 114 can be, for example, a hardware based integrated circuit (IC) or any other suitable processing device configured to run and/or execute a set of instructions or code. For example, the processor 114 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 114 can be configured to run any of the methods and/or portions of methods discussed herein.

The memory 112 can be, for example, a random-access memory (RAM), a memory buffer, a hard drive, a read-only memory (ROM), an erasable programmable read-only memory (EPROM), and/or the like. The memory 112 can be configured to store sensor data collected by the sensor(s) 120, data received from the input device 130, and any other data used by the processor 114 to perform the techniques discussed herein. In some instances, the memory 112 can store, for example, one or more software programs and/or code that can include instructions to cause the processor 114 to perform one or more processes, functions, and/or the like. In some implementations, the memory 112 can include extendible storage units that can be added and used incrementally. In some implementations, the memory 112 can be a portable memory (for example, a flash drive, a portable hard disk, and/or the like) that can be operatively coupled to the processor 114. In some instances, the memory 112 can be remotely operatively coupled with a compute device (not shown). For example, a remote database device can serve as a memory and be operatively coupled to the processor 114.

The memory 112 can store a software model(s) (not shown). The software model(s) can be, for example, an artificial intelligence (AI) model(s), a machine learning (ML) model(s), an analytical model(s), or a mathematical model(s). After the processor 114 has received the data from the sensor(s) 120, the processor 114 can process the sensor data using software model(s) to determine whether the lane change maneuver can be performed safely. The software model(s) can calculate one or more kinds of data such as position, speed, size, and/or other types of data associated with the surroundings of the autonomous vehicle to determine whether a change lane can be performed safely. If it is determined that the lane change maneuver can be performed safely, a signal is sent by the processor 114 to cause the autonomous vehicle to perform the lane change maneuver. A notification can also be sent to notify the driver that the autonomous vehicle can perform the lane change safely. If it is determined that it is not safe to perform the lane change maneuver, a notification is sent by the processor 114 to notify the driver that the lane change maneuver cannot be performed. Note that the notification(s) to the driver to indicate whether the lane change maneuver can be performed safely can be audible, visual, vibrating, or any combination of appropriate type of notification methods.

The sensor(s) 120 can include one or more sensors for collecting sensor data. The sensor(s) 120 can be used to observe and gather any information that would be useful for performing the techniques discussed herein, such as information associated with an external environment of the autonomous vehicle 100 and/or the autonomous vehicle 100 itself. The sensor(s) 120 can include, for example, at least one of an inertial measurement unit (IMU), a camera, a radar, or a lidar. The sensor(s) 120 can collect sensor data that includes representations of attributes associated with the autonomous vehicle 100, such as the vehicle's 100 speed, location, acceleration, size, weight, etc. Additionally or alternatively, the sensor(s) 120 can collect sensor data that includes representations of attributes associated with an external environment of the vehicle 100, such as a speed, location, acceleration, size, type, relative distance, movement pattern, etc. of other vehicles, pedestrians, animals, obstacles, etc., and/or location, type, relative distance, size, shape, etc. of signs, lane markers, shoulder areas, roads, buildings, etc. In some implementations, sensor data collected by the sensor(s) 120 includes information of a topography surrounding the vehicle 100 that is relevant, such as a road, sign, traffic light, walkway, building, body of water, etc.

As sensor data associated with the autonomous vehicle 100 and/or the surrounding region of the autonomous vehicle 100 is being captured by the sensor(s) 120 (e.g., images are captured by the camera 122), processor 114 can analyze the sensor data to detect objects/obstacles near the autonomous vehicle 100. For example, processor 114 can use software model(s) such as machine learning models (e.g., a computer vision model that uses a library of programming function such as those in OpenCV) to identify any type of object in an image captured by the camera 122 (or lidar, or radar). Examples of objects to be detected can include one or more of people, animals, cars, trucks, bikes, motorcycles, trees, signs, lane markings, cones, and/or rocks. Additionally, software model(s) such as machine learning models can be used to detect features associated with the detected objects. For example, the processor 114 can use a machine learning model (e.g., computer vision model) to identify features associated with the detected objects. Examples of features to be detected can include one or more of a position, speed, size, and/or type associated with the object. Additional discussion related to object/feature detection are discussed in U.S. Pat. No. 11,042,155, the contents of which are incorporated in its entirety herein.

The autonomous vehicle 100 can be, for example, a medium truck, heavy truck, very heavy truck, greater than 14,000 pounds, greater than 26,000 pounds, greater than 70,000 pounds, or greater than 80,000 pounds. To ensure that larger vehicles have enough time/distance to perform appropriate maneuvers, the objects can be detected well in advance. In one or more implementations, the object can be detected well in advance using long range sensors (e.g., long range radar sensor) included in the sensor(s) 120.

The input device 130 operatively coupled to the electronic control unit (ECU) 110 is disposed within the autonomous vehicle 110 and is configured to receive actuation patterns to indicate driver's consent of causing a lane change maneuver. The input device 130 can be any kind of input device capable of receiving input signals from the driver. For example, the input device 130 can be a touch screen input device, a turn signal arm/lever, a knob in the autonomous vehicle 100, or a button in the autonomous vehicle 100, etc. Although FIG. 1 shows input device 130, it should be understood that the input device 130 can include one or more touch screens, one or more turn signal arms/levers, one or more knobs, one or more buttons, and a combination of any kind of input devices mentioned above. Of course, other types of input devices can be used, as appropriate, to obtain input signal from the driver, such as microphone to obtain voice command from the driver, or imaging sensor (e.g., camera) to obtain hand gestures from the driver. The actuation pattens for indicating driver lane change consent could be, for example, two consecutive actions performed by the driver, for example, double-toggling (e.g., shifting) the input device 130 if the input device 130 is a turn signal arm/lever, double-tapping the input device 130 if the input device is a touch screen input device, double turning the input device 130 if the input device is a knob, double pressing the input device if the input device is a button, etc. The actuation pattens for indicating driver lane change consent could also be a combination of input signals on different input devices, for example, toggling (e.g., shifting) a turn signal arm/lever and then tapping a touch screen, turning a knob and then pressing a button, sending a voice command such as "Plus, make a lane change" and then tapping a touch screen, etc. Of course, other types of actuation patterns can be used, as appropriate, to obtain driver lane change consent that are distinct from standard operations to avoid unintended consent. Generally speaking, standard operations relate to actuating an input device by its intended input pattern to actuate the input device for its intended use. Standard operations can include, for example, toggling (e.g., shifting) a turn signal arm/lever once to indicate a turn, tapping a touch screen once to select a displayed icon, turning a knob once to indicate an adjustment, pressing a button once to select an item, turning a radio button on to turn on the radio, pressing the phone mute button to mute the phone, pressing the cruise control button to turn on the cruise control, etc. Of course, other types of standard operations exist and the examples above are not meant to be exhaustive. The advantage of using actuation patterns that are distinct or different from the actuation patterns for standard operations is to avoid an actuation pattern for a standard operation being misinterpreted as driver lane change consent. Any type of actuation patterns that differ from any type of standard operations to serve the purpose would be appropriate.

The actuation patterns received by input device 130 to indicate driver lane change consent can also involve the actuation patterns being received within a predetermined time period. For example, the predetermined time period could be 5 seconds. In this case, the driver has a 5 second window to perform the actuation patterns to indicate lane change consent for the autonomous vehicle 100. For other examples, double-toggling (e.g., shifting) the turn signal arm/lever within 5 seconds, double-tapping a touch screen input device within 5 seconds, double turning a knob within 5 seconds, double pressing a button within 5 seconds, etc. can indicate drive lane change consent. The actuation pattens for indicating driver lane change consent could also be a combination of input signals on different input devices within the predetermined time period, for example, toggling (e.g., shifting) a turn signal arm/lever and then tapping a touch screen within 5 seconds, turning a knob and then pressing a button within 5 seconds, sending a voice command such as "Plus, make a lane change" and then tapping a touch screen within 5 seconds etc. Of course, other types of actuation patterns can be used, as appropriate, to obtain within a predetermined time period drive lane change consent that is distinct from standard operations to avoid unintended consent.

The communication interface 116 operatively coupled to the processor 114 is configured to, over a communication backbone (not shown) of the autonomous vehicle 100, send signals to and receive signals from to a different ECU(s) of the autonomous vehicle 100. The processor 114, the communication interface 116 and the memory 112 collectively define the ECU 110. The ECU 110 is separate and distinct from every other ECU(s) in the autonomous vehicle 100 and operatively coupled to the communication backbone.

Figure 2:
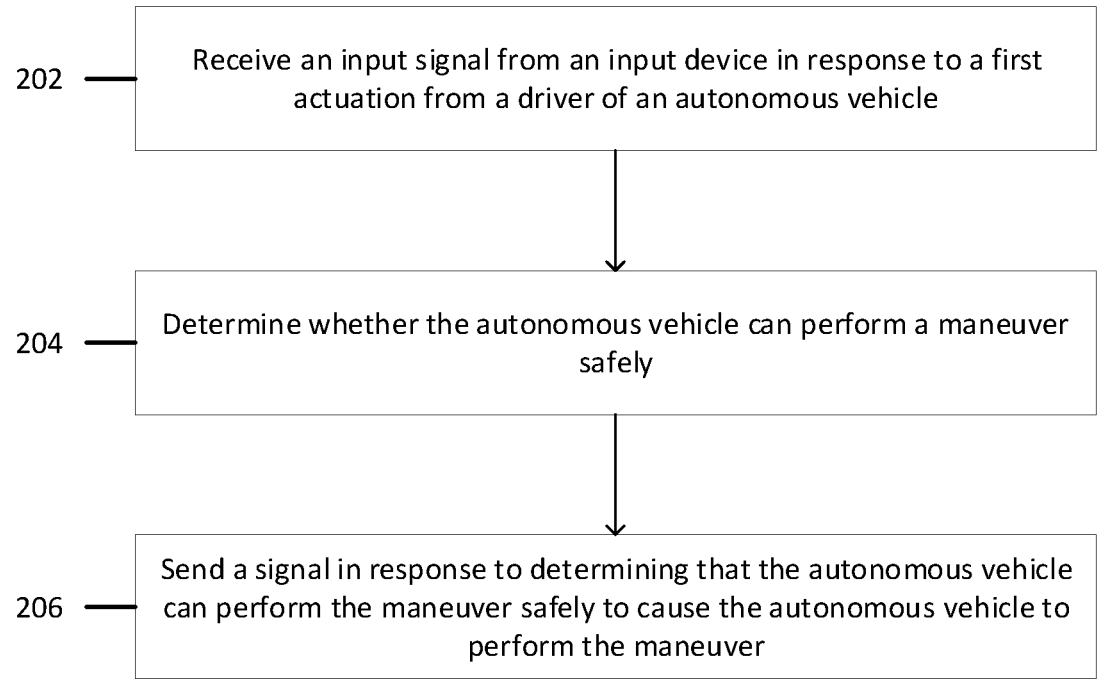
FIG. 2 shows a flowchart of a method for performing a lane change maneuver of an autonomous vehicle, according to an embodiment.

FIG. 2 shows a flowchart of a method for performing a lane change maneuver of an autonomous vehicle, according to an embodiment. In some implementations, the method of FIG. 2 can be performed by the processor 114 of the ECU 110.

At 202, an input signal is received at a processor (e.g., processor 114). The input signal is received from the input device (e.g., input device 130) by the driver of the autonomous vehicle in response to an actuation pattern of the input device. The actuation pattern received by the input device indicates driver's lane change consent. Any type of actuation patterns that differ from any type of standard operations to avoid unintended consent would be appropriate. The actuation pattens for indicating driver lane change consent could be, for example, two consecutive actions performed by the driver, for example, double-toggling (e.g., shifting) the input device 130 if the input device 130 is a turn signal arm/lever, double-tapping the input device 130 if the input device is a touch screen input device, double turning the input device 130 if the input device is a knob, double pressing the input device if the input device is a button, two consecutive voice commands if the input device is a microphone, etc. The actuation pattens for indicating driver lane change consent could also be a combination of input signals on different input devices, for example, toggling (e.g., shifting) a turn signal arm/lever and then tapping a touch screen, turning a knob and then pressing a button, sending a voice command such as "Plus, make a lane change" and then tapping a touch screen, etc. Of course, other types of actuation patterns can be used, as appropriate, to obtain driver lane change consent that are distinct from standard operations to avoid unintended consent.

At 204, the processor determines whether the autonomous vehicle can perform a maneuver (e.g., a lane change maneuver) safely based on the data received from the sensor(s) at the autonomous vehicle (e.g., sensor(s) 120). The sensor(s) can include, for example, at least one of an inertial measurement unit (IMU), a camera, a radar, or a lidar. The sensor(s) can collect sensor data that includes representations of attributes associated with the autonomous vehicle, such as the autonomous vehicle's speed, location, acceleration, size, weight, etc. Additionally or alternatively, the sensor(s) can collect sensor data that includes representations of attributes associated with an external environment of the autonomous vehicle, such as a speed, location, acceleration, size, type, relative distance, movement pattern, etc. of other vehicles, pedestrians, animals, obstacles, etc., and/or location, type, relative distance, size, shape, etc. of signs, lane markers, shoulder areas, roads, buildings, etc. In some implementations, sensor data collected by the sensor(s) includes information of a topography surrounding the autonomous vehicle that is relevant, such as a road, sign, traffic light, walkway, building, body of water, etc.

As sensor data associated with the autonomous vehicle and/or the surrounding region of the autonomous vehicle is being captured by the sensor(s) (e.g., images are captured by the camera 122), the processor can analyze the sensor data to detect objects/obstacles near the autonomous vehicle. For example, the processor can use software model(s) such as machine learning models (e.g., a computer vision model that uses a library of programming function such as those in OpenCV) to identify any type of object in an image captured by the camera (or lidar, or radar). Examples of objects to be detected can include one or more of people, animals, cars, trucks, bikes, motorcycles, trees, signs, lane markings, cones, and/or rocks. Additionally, software model(s) such as machine learning models can be used to detect features associated with the detected objects. For example, the processor can use a machine learning model (e.g., computer vision model) to identify features associated with the detected objects. Examples of features to be detected can include one or more of a position, speed, size, and/or type associated with the object. The processor can further use a software model to estimate features associated with the detected objects, such as one or more of a relative position, relative speed, etc., of each detected object within in the surrounding area of the autonomous vehicle. Based on the estimated features (e.g., relative position, relative speed etc. of each detected object), the processor determines whether the lane change maneuver can be performed safely.

At 206, a signal is sent by the processor to a control unit of the autonomous vehicle in response to determining that the autonomous vehicle can perform the maneuver safely to cause the vehicle to perform the maneuver. After receiving the signal from the processor to indicate that the lane change maneuver can be performed safely, the control unit (not shown in FIG. 2) can trigger the autonomous vehicle to steer the autonomous vehicle to perform the lane change maneuver. In some embodiments, the processor can further send a signal to an output device (not shown) to output a notification after determining that the maneuver can be performed safely. The notification(s) to the driver that the lane change maneuver can be performed safely can be audible, visual, vibrating, or any combination of appropriate type of notification methods. In other implementations, if it is determined that the lane change maneuver cannot be performed safely, a signal is sent by the processor in response to determining that the autonomous vehicle cannot perform the maneuver safely to prevent the vehicle from performing the maneuver. A notification is sent by the processor to the output device (not shown) to notify the driver that the lane change maneuver cannot be performed. The notification(s) to the driver that the lane change maneuver cannot be performed safely can be audible, visual, vibrating, or any combination of appropriate type of notification methods. In yet some other embodiments, before receiving the input signal at 202, a signal can be sent by the processor to the output device to output a notification to request the maneuver (e.g., lane change). The notification(s) to the driver to request lane change maneuver can be audible, visual, vibrating, or any combination of appropriate type of notification methods.

Figure 3:
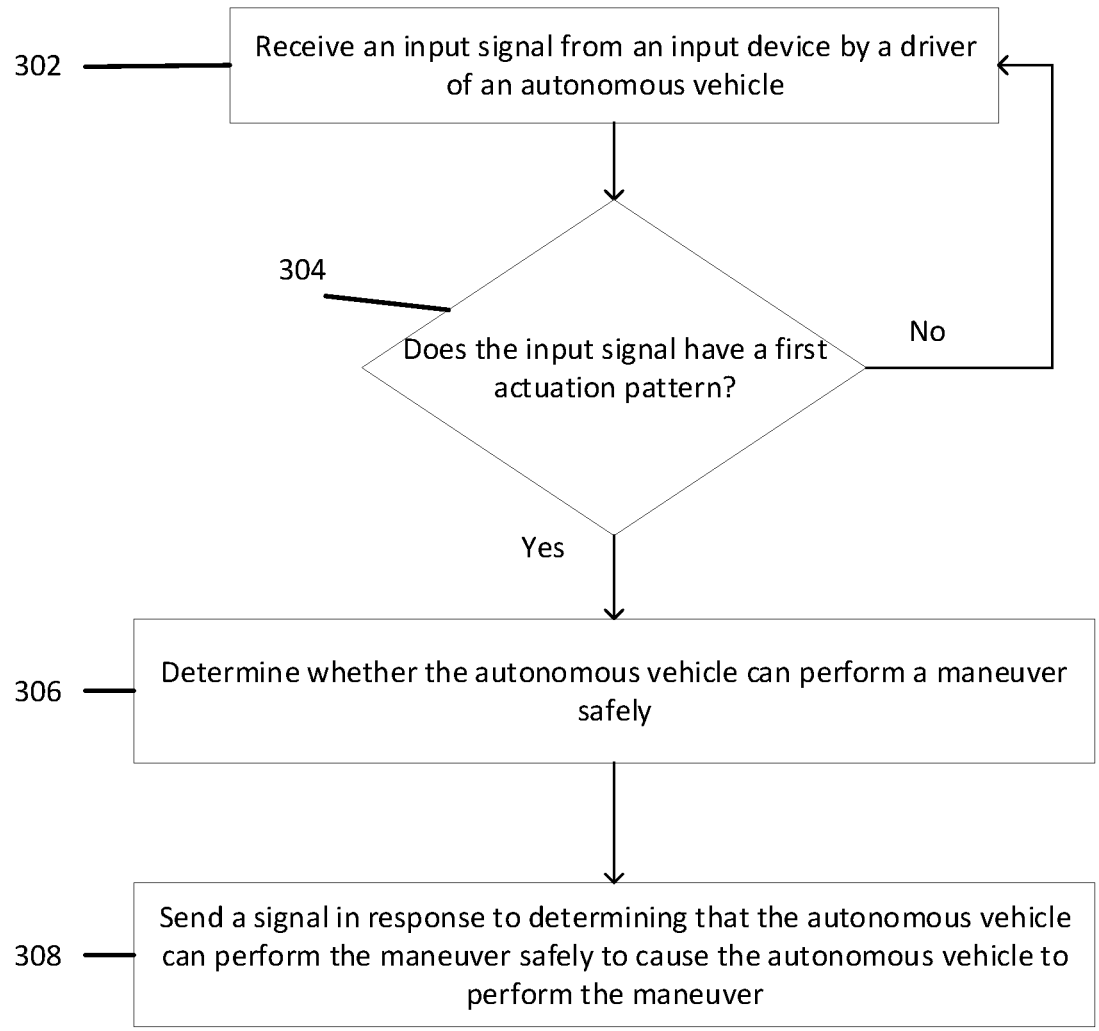
FIG. 3 shows a flowchart of a method for performing a lane change maneuver of an autonomous vehicle, according to another embodiment.

FIG. 3 shows a flowchart of a method for performing a lane change maneuver of an autonomous vehicle, according to another embodiment. In some implementations, the method of FIG. 3 can be performed by the processor 114 of the ECU 110.

At 302, an input signal is received at a processor (e.g., processor 114). The input signal is received from an input device (e.g., input device 130) by the driver of the autonomous vehicle in response to an actuation pattern of the input device.

At 304, based on the received input signal, the processor determines if the input signal is associated with a first actuation pattern(s) that indicate driver's lane change consent.

If the input signal is determined to be associated with the first actuation pattern(s) that indicate driver's lane change consent, proceed to 306. Any type of actuation patterns that differ from any type of standard operations to avoid unintended consent would be appropriate. The actuation pattens for indicating driver lane change consent could be, for example, two consecutive actions performed by the driver, for example, double-toggling (e.g., shifting) the input device (e.g., input device 130) if the input device is a turn signal arm/lever, double-tapping the input device (e.g., input device 130) if the input device is a touch screen input device, double turning the input device (e.g., input device 130) if the input device is a knob, double pressing the input device (e.g., input device 130) if the input device is a button, two consecutive voice commands if the input device is a microphone, etc. The actuation pattens for indicating driver lane change consent could also be a combination of input signals on different input devices, for example, toggling (e.g., shifting) a turn signal arm/lever and then tapping a touch screen, turning a knob and then pressing a button, sending a voice command such as "Plus, make a lane change" and then tapping a touch screen, etc. Of course, other types of actuation patterns can be used, as appropriate, to obtain driver lane change consent that are distinct from standard operations to avoid unintended consent.

If the input signal is determined to be not associated with the first actuation pattern(s) that indicates driver's lane change consent, the method returns to 302. In some implementations, the actuation pattern(s) not associated with the first actuation pattern(s) that indicates driver's lane change consent can be in response to standard operation(s). Generally speaking, standard operations relate to actuating an input device by its intended input pattern to actuate the input device for its intended use. Standard operations can include, for example, toggling (e.g., shifting) a turn signal arm/lever once to indicate a turn, tapping a touch screen once to select a displayed icon, turning a knob once to indicate an adjustment, pressing a button once to select an item, turning a radio button on to turn on the radio, pressing the phone mute button to mute the phone, pressing the cruise control button to turn on the cruise control, etc. Of course, other types of standard operations exist and the examples above are not meant to be exhaustive. The advantage of using actuation patterns that are distinct or different from the actuation patterns for standard operations is to avoid an actuation pattern for a standard operation being misinterpreted as driver lane change consent. Any type of actuation patterns that differs from any type of standard operations to serve the purpose would be appropriate. In other implementations, if the input signal is determined to be not associated with the first actuation pattern(s) that indicates driver's lane change consent, a signal can be sent by the processor to the output device to output a notification to request the maneuver (e.g., lane change). For example, the notification can be an audio broadcast such as "Do you want to make a lane change?" or a flashing message on a screen, etc. The notification(s) to the driver to request lane change maneuver can be audible, visual, vibrating, or any combination of appropriate type of notification methods.

The actuation patterns received by the input device can also involve the actuation patterns being received within a predetermined time period. For example, the predetermined time period could be 5 seconds. In this case, the driver has a 5 second window to perform the actuation patterns. For example, actuation patterns that indicate driver's lane change consent could be double-toggling (e.g., shifting) the turn signal arm/lever in a direction within 5 seconds, double-tapping a touch screen input device within 5 seconds, double turning a knob within 5 seconds, double pressing a button within 5 seconds, etc. The actuation pattens for indicating driver lane change consent could also be a combination of input signals on different input devices within the predetermined time period, for example, toggling (e.g., shifting) a turn signal arm/lever and then tapping a touch screen within 5 seconds, turning a knob and then pressing a button within 5 seconds, sending a voice command such as "Plus, make a lane change" and then tapping a touch screen within 5 seconds etc. Of course, other types of actuation patterns can be used, as appropriate, to obtain within a predetermined time period drive lane change consent that is distinct from standard operations to avoid unintended consent.

The actuation patterns in response to standard operations can also involve the actuation patterns being received within a predetermined time period. For example, the predetermined time period could be 5 seconds. In this case, the driver has a 5 second window to perform the actuation patterns. For example, actuation patterns in response to standard operations could be toggling (e.g., shifting) the turn signal arm/lever once in a direction within 5 seconds, tapping a touch screen input device once within 5 seconds, turning a knob once within 5 seconds, pressing a button once within 5 seconds, etc. Of course, other types of standard operations exist and the examples above are not meant to be exhaustive.

At 306, the processor determines whether the autonomous vehicle can perform a maneuver (e.g., a lane change maneuver) safely based on the data received from the sensor(s) at the autonomous vehicle (e.g., sensor(s) 120). The sensor(s) can include, for example, at least one of an inertial measurement unit (IMU), a camera, a radar, or a lidar. The sensor(s) can collect sensor data that includes representations of attributes associated with the autonomous vehicle, such as the autonomous vehicle's speed, location, acceleration, size, weight, etc. Additionally or alternatively, the sensor(s) can collect sensor data that includes representations of attributes associated with an external environment of the autonomous vehicle, such as a speed, location, acceleration, size, type, relative distance, movement pattern, etc. of other vehicles, pedestrians, animals, obstacles, etc., and/or location, type, relative distance, size, shape, etc. of signs, lane markers, shoulder areas, roads, buildings, etc. In some implementations, sensor data collected by the sensor(s) includes information of a topography surrounding the autonomous vehicle that is relevant, such as a road, sign, traffic light, walkway, building, body of water, etc.

As sensor data associated with the autonomous vehicle and/or the surrounding region of the autonomous vehicle is being captured by the sensor(s) (e.g., images are captured by the camera 122), the processor can analyze the sensor data to detect objects/obstacles near the autonomous vehicle. For example, the processor can use software model(s) such as machine learning models (e.g., a computer vision model that uses a library of programming function such as those in OpenCV) to identify any type of object in an image captured by the camera (or lidar, or radar). Examples of objects to be detected can include one or more of people, animals, cars, trucks, bikes, motorcycles, trees, signs, lane markings, cones, and/or rocks. Additionally, software model(s) such as machine learning models can be used to detect features associated with the detected objects. For example, the processor can use a machine learning model (e.g., computer vision model) to identify features associated with the detected objects. Examples of features to be detected can include one or more of a position, speed, size, and/or type associated with the object. The processor can further use a software model to estimate features associated with the detected objects, such as one or more of a relative position, relative speed, etc., of each detected object within in the surrounding area of the autonomous vehicle. Based on the estimated features (e.g., relative position, relative speed etc. of each detected object), the processor determines whether the lane change maneuver can be performed safely.

At 308, a signal is sent by the processor to a control unit of the autonomous vehicle in response to determining that the autonomous vehicle can perform the maneuver safely to cause the vehicle to perform the maneuver. After receiving the signal from the processor to indicate that the lane change maneuver can be performed safely, the control unit (not shown in FIG. 3) can trigger the autonomous vehicle to steer the wheels to perform the lane change maneuver. In some embodiments, the processor can further send a signal to an output device (not shown in FIG. 3) to output a notification after determining that the maneuver can be performed safely. The notification(s) to the driver that the lane change maneuver can be performed safely can be audible, visual, vibrating, or any combination of appropriate type of notification methods. In other implementations, if it is determined that the lane change maneuver cannot be performed safely, a signal is sent by the processor in response to determining that the autonomous vehicle cannot perform the maneuver safely to prevent the vehicle from performing the maneuver. A notification is sent by the processor to the output device (not shown) to notify the driver that the lane change maneuver cannot be performed. The notification(s) to the driver that the lane change maneuver cannot be performed safely can be audible, visual, vibrating, or any combination of appropriate type of notification methods. In yet some other implementations, before receiving the input signal at 302, a signal can be sent by the processor to the output device to output a notification to request the maneuver (e.g., lane change). The notification(s) to the driver to request lane change maneuver can be audible, visual, vibrating, or any combination of appropriate type of notification methods. In yet some other implementations, before receiving the input signal at 302, the processor is prevented from sending the signal to the control unit (not shown in FIG. 3) of the autonomous vehicle to cause the autonomous vehicle to perform the maneuver. In other words, the signal to cause the autonomous vehicle to perform the maneuver will not be sent by the processor until the processor receives the driver's lane change consent and confirms that the lane change maneuver can be performed safely. For example, if the processor does not receive an input signal in response to an actuation pattern that indicates driver's lane change consent, the processor does not send the signal to cause the vehicle to perform the maneuver. The autonomous vehicle remains in the same lane. The processor remains in standby mode until the input signal is received.

Figure 4:
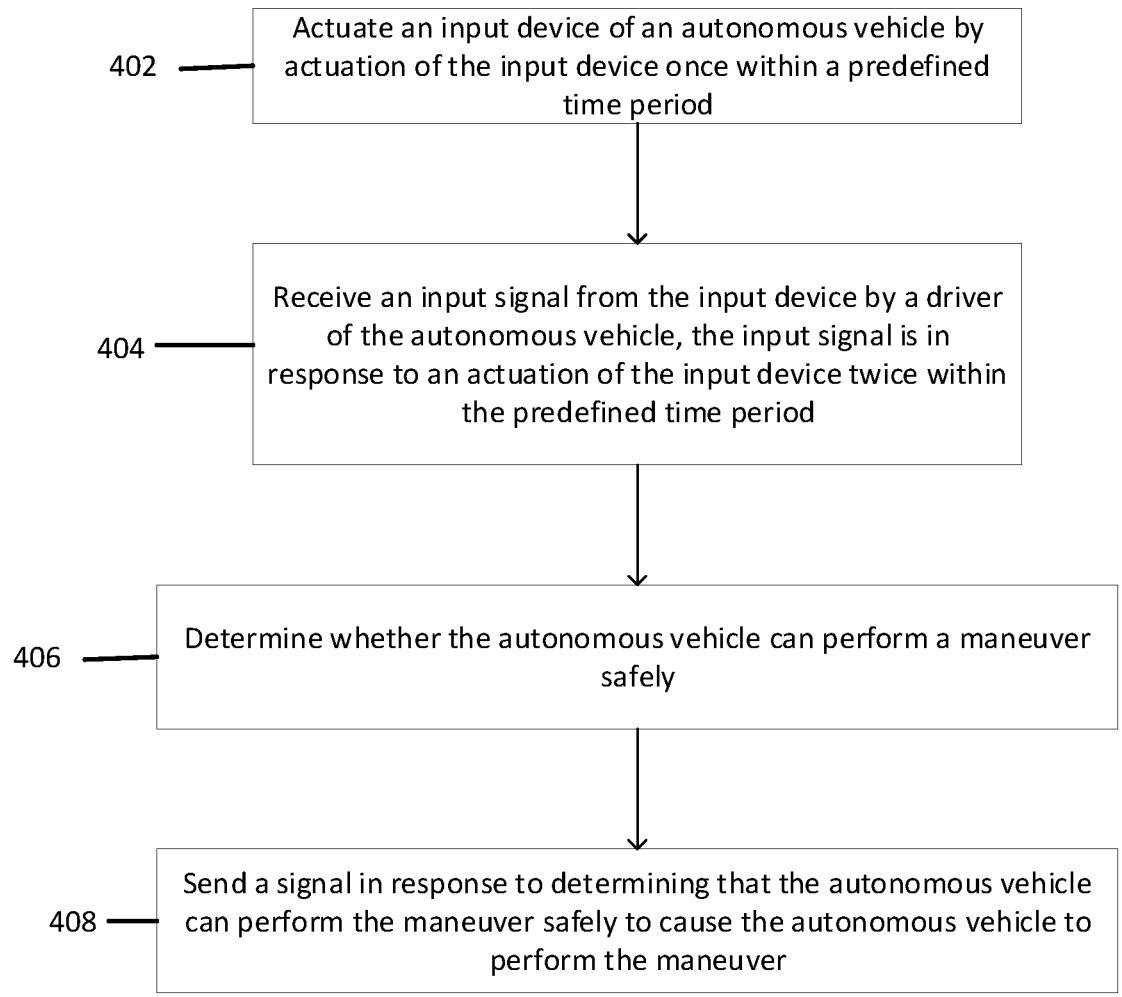
FIG. 4 shows a flowchart of a method for performing a lane change maneuver of an autonomous vehicle, according to yet another embodiment.

FIG. 4 shows a flowchart of a method for performing a lane change maneuver of an autonomous vehicle, according to yet another embodiment. In some implementations, the method of FIG. 4 can be performed by the processor 114 of the ECU 110.

At 402, an input device (e.g., input device 130) of an autonomous vehicle is actuated by an actuation pattern by the driver of the autonomous vehicle. The actuation pattern is an actuation of the input device once within a predetermined time period. The actuation pattern of actuating the input device once does not indicate driver's consent of a lane change. The predefined time period is sufficient to distinguish between an instance of the actuation pattern being an actuation of the input device twice (indicating driver's consent of lane change as explained below for 404) and two instances of the actuation pattern being an actuation of the input device once (not indicating driver's consent of lane change). In some implementations, the predetermined time period could be 5 seconds. That is, the driver has a 5 second window to perform the actuation patterns. The actuation pattern(s) relates to actuating an input device by its intended input pattern to actuate the input device for its intended use. For example, when the actuation pattern does not indicate driver consent, the actuation patterns can include, for example, toggling (e.g., shifting) a turn signal arm/lever once in a direction to indicate a turn within 5 seconds, tapping a touch screen once to select a displayed icon within 5 seconds, turning a knob once to indicate an adjustment within 5 seconds, pressing a button once to select an item within 5 seconds, turning a radio button on to turn on the radio within 5 seconds, pressing the phone mute button to mute the phone within 5 seconds, pressing the cruise control button to turn on the cruise control within 5 seconds, etc. Of course, other types of standard operations exist and the examples above are not meant to be exhaustive.

At 404, an input signal is received at a processor (e.g., processor 114). The input signal is received from the input device (e.g., input device 130) by the driver of the autonomous vehicle in response to an actuation pattern of the input device. The actuation pattern(s) is an actuation of the input device twice within the predetermined time period. For example, the predetermined time period could be 5 seconds, and thus the driver has a 5 second window to perform an actuation pattern. The actuation pattern of actuating the input device twice within the predetermined time period indicates driver's consent of lane change. The predefined time period is sufficient to distinguish between an instance of the actuation pattern being an actuation of the input device twice (indicates driver's consent of lane change) and two separate single actuations of the input device (not indicates driver's consent of lane change). Any type of actuation patterns that differ from any type of standard operations to avoid unintended consent would be appropriate. The actuation pattens of actuating the input device twice within the predetermined time period could be two consecutive actions performed by the driver within 5 seconds, for example, double-toggling (e.g., shifting) the input device (e.g., input device 130) in a direction within 5 seconds if the input device is a turn signal arm/lever, double-tapping the input device within 5 seconds if the input device is a touch screen input device, double turning the input device within 5 seconds if the input device is a knob, double pressing the input device within 5 seconds if the input device is a button, two consecutive voice commands within 5 seconds if the input device is a microphone, etc. Of course, other types of actuation patterns can be used, as appropriate, to obtain driver lane change consent that are distinct from standard operations to avoid unintended consent.

At 406, the processor determines whether the autonomous vehicle can perform a maneuver (e.g., a lane change maneuver) safely based on the data received from the sensor(s) at the autonomous vehicle (e.g., sensor(s) 120). The sensor(s) can include, for example, at least one of an inertial measurement unit (IMU), a camera, a radar, or a lidar. The sensor(s) can collect sensor data that includes representations of attributes associated with the autonomous vehicle, such as the autonomous vehicle's speed, location, acceleration, size, weight, etc. Additionally or alternatively, the sensor(s) can collect sensor data that includes representations of attributes associated with an external environment of the autonomous vehicle, such as a speed, location, acceleration, size, type, relative distance, movement pattern, etc. of other vehicles, pedestrians, animals, obstacles, etc., and/or location, type, relative distance, size, shape, etc. of signs, lane markers, shoulder areas, roads, buildings, etc. In some implementations, sensor data collected by the sensor(s) includes information of a topography surrounding the autonomous vehicle that is relevant, such as a road, sign, traffic light, walkway, building, body of water, etc.

As sensor data associated with the autonomous vehicle and/or the surrounding region of the autonomous vehicle is being captured by the sensor(s) (e.g., images are captured by the camera 122), the processor can analyze the sensor data to detect objects/obstacles near the autonomous vehicle. For example, the processor can use software model(s) such as machine learning models (e.g., a computer vision model that uses a library of programming function such as those in OpenCV) to identify any type of object in an image captured by the camera (or lidar, or radar). Examples of objects to be detected can include one or more of people, animals, cars, trucks, bikes, motorcycles, trees, signs, lane markings, cones, and/or rocks. Additionally, software model(s) such as machine learning models can be used to detect features associated with the detected objects. For example, the processor can use a machine learning model (e.g., computer vision model) to identify features associated with the detected objects. Examples of features to be detected can include one or more of a position, speed, size, and/or type associated with the object. The processor can further use a software model to estimate features associated with the detected objects, such as one or more of a relative position, relative speed, etc., of each detected object within in the surrounding area of the autonomous vehicle. Based on the estimated features (e.g., relative position, relative speed etc. of each detected object), the processor determines whether the lane change maneuver can be performed safely.

At 408, a signal is sent by the processor to a control unit of the autonomous vehicle in response to determining that the autonomous vehicle can perform the maneuver safely to cause the vehicle to perform the maneuver. After receiving the signal from the processor to indicate that the lane change maneuver can be performed safely, the control unit (not shown in FIG. 4) can trigger the autonomous vehicle to steer the wheels to perform the lane change maneuver. In some embodiments, the processor can further send a signal to an output device (not shown in FIG. 4) to output a notification after determining that the maneuver can be performed safely. The notification(s) to the driver that the lane change maneuver can be performed safely can be audible, visual, vibrating, or any combination of appropriate type of notification methods. In other implementations, if it is determined that the lane change maneuver cannot be performed safely, a signal is sent by the processor in response to determining that the autonomous vehicle cannot perform the maneuver safely to prevent the vehicle from performing the maneuver. A notification is sent by the processor to the output device (not shown) to notify the driver that the lane change maneuver cannot be performed. The notification(s) to the driver that the lane change maneuver cannot be performed safely can be audible, visual, vibrating, or any combination of appropriate type of notification methods.

In some embodiments, a method, comprises: receiving, at a processor, an input signal from an input device in response to a first actuation of the input device by a driver of an autonomous vehicle, the input device being a device disposed with the autonomous vehicle and having a second actuation of the input device associated with a standard operation of the input device, the second actuation having an actuation pattern different from an actuation pattern of the first actuation; determining, at the processor and in response to the input signal, whether the autonomous vehicle can perform a maneuver safely; and sending a signal, from the processor and in response to determining that the autonomous vehicle can perform the maneuver safely, to cause the autonomous vehicle to perform the maneuver.

In some implementations, the method further comprises: sending a signal, from the processor and in response to determining that the autonomous vehicle can perform the maneuver safely, to cause an output device disposed with the autonomous vehicle to output an announcement to the driver that the maneuver is safe.

In some implementations, the method further comprises: sending a signal, from the processor and before receiving the input signal, to cause output of a first announcement to the driver to request the maneuver; and sending a signal, from the processor and in response to determining that the autonomous vehicle can perform the maneuver safely, to cause an output device disposed with the autonomous vehicle to output a second announcement to the driver that the maneuver is safe.

In some implementations, the actuation pattern of the second actuation is an actuation of the input device once, within a predefined time period, and the actuation pattern of the first actuation is an actuation of the input device twice, within a predefined time period.

In some implementations, the maneuver is a lane change, the input device is a turn signal lever, the actuation pattern of the second actuation is a shift of the turn signal lever once in a direction within a predefined time period, and the actuation pattern of the first actuation is a shift of the turn signal lever twice in the direction within the predefined time period.

In some implementations, the method further comprises: preventing the processor from sending the signal to cause the autonomous vehicle to perform the maneuver before receiving the input signal.

In some implementations, the determining includes: receiving, at the processor, sensor data from at least one camera disposed with the autonomous vehicle; detecting, at the processor, any objects within a surrounding of the autonomous vehicle; and estimating, at the processor, a relative position and a relative speed of each object within the surrounding of the autonomous vehicle. The determining is based on the relative position and the relative speed of each object within the surrounding of the autonomous vehicle.

In an embodiment, an apparatus, comprises: a processor; a communication interface operatively coupled to the processor and configured to send and receive signals over a communication backbone of an autonomous vehicle; and a memory operatively coupled to the processor, the memory storing instructions to cause the processor to: receive an input signal from an input device of the autonomous vehicle in response to a first actuation of the input device by a driver of the autonomous vehicle, the input device having a second actuation associated with a standard operation of the input device, the second actuation having an actuation pattern different from an actuation pattern of the first actuation, determine, in response to the input signal, whether the autonomous vehicle can perform a maneuver safely, and send a signal, in response to determining that the autonomous vehicle can perform the maneuver safely, to cause the autonomous vehicle to perform the maneuver.

In some implementations, the processor, the communication interface and the memory collectively define an electronic control unit (ECU).

In some implementations, the processor, the communication interface and the memory collectively define an electronic control unit (ECU) that is separate and distinct from every other ECU in the autonomous vehicle operatively coupled to the communication backbone.

In some implementations, the instructions further include instructions to cause the processor to: send a signal, from the processor and in response to determining that the autonomous vehicle can perform the maneuver safely, to cause an output device disposed with the autonomous vehicle to output an announcement to the driver that the maneuver is safe.

In some implementations, the actuation pattern of the second actuation is an actuation of the input device once, within a predefined time period, and the actuation pattern of the first actuation is an actuation of the input device twice, within a predefined time period.

In some implementations, the maneuver is a lane change, the input device is a turn signal lever, the actuation pattern of the second actuation is a shift of the turn signal lever once in a direction within a predefined time period, and the actuation pattern of the first actuation is a shift of the turn signal lever twice in the direction within the predefined time period.

In some implementations, the instructions further include instructions to cause the processor to: prevent the processor from sending the signal to cause the autonomous vehicle to perform the maneuver before receiving the input signal.

In some implementations, the instructions further include instructions to cause the processor to: receive, at the processor, sensor data from at least one camera disposed with the autonomous vehicle; detect, at the processor, any objects within a surrounding of the autonomous vehicle; and estimate, at the processor, a relative position and a relative speed of each object within the surrounding of the autonomous vehicle. The determining is based on the relative position and the relative speed of each object within the surrounding of the autonomous vehicle.

In some embodiments, a method, comprises: receiving, at a processor, an input signal from an input device in response to a first actuation of the input device by a driver of an autonomous vehicle, the input device configured to be actuated by a second actuation by the driver, an actuation pattern of the second actuation being an actuation of the input device once within a predefined time period, an actuation pattern of the first actuation being an actuation of the input device twice within the predefined time period; determining, at the processor and in response to the input signal, whether the autonomous vehicle can perform a maneuver safely; and sending a signal, from the processor and in response to determining that the autonomous vehicle can perform the maneuver safely, to cause the autonomous vehicle to automatically perform the maneuver.

In some implementations, the predefined time period is five seconds.

In some implementations, the predefined time period is sufficient to distinguish between an instance of the first actuation pattern and two instances of the second actuation pattern.

In some implementations, the maneuver is a lane change, the input device is a turn signal lever, the actuation pattern of the second actuation is a shift of the turn signal lever once in a direction within the predefined time period, and the actuation pattern of the first actuation is a shift of the turn signal lever twice in the direction within the predefined time period.

In some implementations, the determining includes: receiving, at the processor, sensor data from at least one camera disposed with the autonomous vehicle; detecting, at the processor, any objects within a surrounding of the autonomous vehicle; and estimating, at the processor, a relative position and a relative speed of each object within the surrounding of the autonomous vehicle. The determining is based on the relative position and the relative speed of each object within the surrounding of the autonomous vehicle.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

As used herein, "substantially concurrently" can refer to events that take place at the same time when adjusted for processing-related delays (e.g., computation delay, transmission delay, etc.), or can refer to events that overlap in time.

As used herein, "substantially in real-time" can refer to an event that occurs immediately following a predicate event, adjusted for processing-related delays (e.g., computation delay, transmission delay, etc.).

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A computer-implemented method comprising:
   determining, by a computing system, a first command provided by a person in a vehicle and received by a first type of actuating device;
   determining, by the computing system, a second command provided by the person and received by a second type of non-actuating device;
   determining, by the computing system, a predetermined relationship between the first command and the second command, wherein the predetermined relationship is associated with receipt of the second command by the second type of non-actuating device within a selected time duration after receipt of the first command by the first type of actuating device;
   generating, by the computing system, a signal to cause the vehicle to perform a maneuver associated with the first command and the second command; and
   automatically, by the computing system, performing the maneuver based on the signal.

2. The computer-implemented method of claim 1, wherein the first type of actuating device is at least one of an arm, a lever, a knob, and a button.

3. The computer-implemented method of claim 2, wherein the first command is associated with at least one of shifting the arm, shifting the lever, turning the knob, and pressing the button.

4. The computer-implemented method of claim 1, wherein the second type of non-actuating device is at least one of a touch screen, a microphone, and an image sensor.

5. The computer-implemented method of claim 4, wherein the second command is associated with at least one of tapping the touch screen, providing a voice command to the microphone, and providing a gesture detected by the image sensor.

6. The computer-implemented method of claim 1, wherein the first command and the second command are associated with an actuation pattern that is indicative of driver consent to the maneuver.

7. The computer-implemented method of claim 1, wherein the first command and the second command are associated with an actuation pattern that is distinguishable from standard operations relating to standard use of the first type of actuating device and the second type of non-actuating device.

8. The computer-implemented method of claim 1, wherein the signal to cause the vehicle to perform the maneuver is not generated before receipt of the first command and the second command.

9. The computer-implemented method of claim 1, further comprising:
   in response to receipt of the first command and the second command, determining whether the vehicle can safely perform the maneuver based on sensor data associated with an environment of the vehicle, wherein the maneuver is a lane change and the vehicle is a truck.

10. A system comprising:
    at least one processor; and
    a memory storing instructions that, when executed by the at least one processor, cause the system to perform operations comprising:
    determining a first command provided by a person in a vehicle and received by a first type of actuating device;
    determining a second command provided by the person and received by a second type of non-actuating device;
    determining a predetermined relationship between the first command and the second command, wherein the predetermined relationship is associated with receipt of the second command by the second type of non-actuating device within a selected time duration after receipt of the first command by the first type of actuating device;
    generating a signal to cause the vehicle to perform a maneuver associated with the first command and the second command; and automatically performing the maneuver based on the signal.

11. The system of claim 10, wherein the first type of actuating device is at least one of an arm, a lever, a knob, and a button.

12. The system of claim 11, wherein the first command is associated with at least one of shifting the arm, shifting the lever, turning the knob, and pressing the button.

13. The system of claim 10, wherein the second type of non-actuating device is at least one of a touch screen, a microphone, and an image sensor.

14. The system of claim 13, wherein the second command is associated with at least one of tapping the touch screen, providing a voice command to the microphone, and providing a gesture detected by the image sensor.

15. A non-transitory computer-readable storage medium including instructions that, when executed by at least one processor of a computing system, cause the computing system to perform operations comprising:
  determining a first command provided by a person in a vehicle and received by a first type of actuating device;
  determining a second command provided by the person and received by a second type of non-actuating device;
  determining a predetermined relationship between the first command and the second command, wherein the predetermined relationship is associated with receipt of the second command by the second type of non-actuating device within a selected time duration after receipt of the first command by the first type of actuating device;
  generating a signal to cause the vehicle to perform a maneuver associated with the first command and the second command; and
  automatically performing the maneuver based on the signal.

16. The non-transitory computer-readable storage medium of claim 15, wherein the first type of actuating device is at least one of an arm, a lever, a knob, and a button.

17. The non-transitory computer-readable storage medium of claim 16, wherein the first command is associated with at least one of shifting the arm, shifting the lever, turning the knob, and pressing the button.

18. The non-transitory computer-readable storage medium of claim 15, wherein the second type of non-actuating device is at least one of a touch screen, a microphone, and an image sensor.

19. The non-transitory computer-readable storage medium of claim 18, wherein the second command is associated with at least one of tapping the touch screen, providing a voice command to the microphone, and providing a gesture detected by the image sensor.

* * * * *